United States Patent
Osada et al.

(10) Patent No.: US 9,899,152 B2
(45) Date of Patent: Feb. 20, 2018

(54) ELECTRONIC COMPONENT

(71) Applicant: MURATA MANUFACTURING CO., LTD., Kyoto-fu (JP)

(72) Inventors: Takanori Osada, Nagaokakyo (JP); Atsushi Takahashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 31 days.

(21) Appl. No.: 15/276,831

(22) Filed: Sep. 27, 2016

(65) Prior Publication Data
US 2017/0018360 A1    Jan. 19, 2017

Related U.S. Application Data

(63) Continuation of application No. PCT/JP2015/058398, filed on Mar. 20, 2015.

(30) Foreign Application Priority Data

Mar. 27, 2014  (JP) ................................ 2014-065453
Jun. 5, 2014   (JP) ................................ 2014-116493

(51) Int. Cl.
*H01G 4/248*  (2006.01)
*H01G 4/232*  (2006.01)
(Continued)

(52) U.S. Cl.
CPC ............. *H01G 4/248* (2013.01); *H01F 17/04* (2013.01); *H01F 27/292* (2013.01);
(Continued)

(58) Field of Classification Search
None
See application file for complete search history.

(56) References Cited

U.S. PATENT DOCUMENTS 8,455,769 B2 *  6/2013  Matsushita .......  H01L 23/49811
                                                   174/255
8,649,155 B2 *  2/2014  Sasaki ...................  H01G 4/002
                                                   361/303

(Continued)

FOREIGN PATENT DOCUMENTS

CN   101276687 A    10/2008
JP   H11-067554 A    3/1999
(Continued)

OTHER PUBLICATIONS

International Search Report issued in PCT/JP2015/058398; dated Jun. 2, 2015.
Written Opinion issued in PCT/JP2015/058398; dated Jun. 2, 2015.

*Primary Examiner* — Dion R Ferguson
(74) *Attorney, Agent, or Firm* — Studebaker & Brackett PC

(57) ABSTRACT

An electronic component capable of suppressing variations in dimension of plating growth of a plating film serving as an external electrode. The external electrodes include plating films formed so as to extend from each of end surfaces to side surfaces of an electronic component body by electrolytic plating. Underlying main electrodes in which the degree of plating growth is relatively high, and underlying sub-electrodes in which the degree of plating growth is relatively low, are formed as a seed electrode serving as a starting point of plating growth for forming a plating film.

13 Claims, 7 Drawing Sheets

(51) Int. Cl.
  *H01F 17/04* (2006.01)
  *H01F 27/29* (2006.01)
  *H01G 4/005* (2006.01)
  *H01G 4/12* (2006.01)
  *H01G 4/30* (2006.01)

(52) U.S. Cl.
  CPC ............... *H01G 4/005* (2013.01); *H01G 4/12* (2013.01); *H01G 4/232* (2013.01); *H01G 4/30* (2013.01)

(56) References Cited

U.S. PATENT DOCUMENTS

| | | | |
|---|---|---|---|
| 2006/0039097 A1* | 2/2006 | Satou | H01G 4/01 361/303 |
| 2008/0239617 A1 | 10/2008 | Motoki et al. | |
| 2009/0310278 A1 | 12/2009 | Tani | |
| 2011/0309718 A1 | 12/2011 | Ogawa et al. | |
| 2017/0011849 A1* | 1/2017 | Osada | H01F 27/292 |

FOREIGN PATENT DOCUMENTS

| | | |
|---|---|---|
| JP | 2004-327983 A | 11/2004 |
| JP | 2007-067026 A | 3/2007 |
| JP | 2010-021523 A | 1/2010 |
| JP | 2012-004330 A | 1/2012 |

* cited by examiner

ELECTRONIC COMPONENT

CROSS REFERENCE TO RELATED APPLICATIONS

This application claims benefit of priority to Japanese Patent Application 2014-065453 filed Mar. 27, 2014, and Japanese Patent Application 2014-116493 filed Jun. 5, 2014, and to International Patent Application No. PCT/JP2015/058398 filed Mar. 20, 2015, the entire content of which is incorporated herein by reference.

TECHNICAL FIELD

The present disclosure relates to an electronic component, and particularly to an electronic component in which at least part of an external electrode is formed by electrolytic plating.

BACKGROUND

In FIG. 12 and FIG. 13, an electronic component 1 of interest to the present disclosure is shown by a perspective view and a sectional view, respectively. The electronic component 1 includes a chip-shaped electronic component body 2. The electronic component body 2 has a cuboid shape in which an outside shape is defined by four side surfaces 3, 4, 5 and 6 and two end surfaces 7 and 8.

An internal conductor of the form appropriate to a function of the electronic component 1 is disposed inside the electronic component body 2. Herein, a coil component is exemplified as an electronic component 1. Therefore, as shown in FIG. 13, a coil conductor 9 is disposed inside the electronic component body 2. In addition, in FIG. 13, the coil conductor 9 is schematically shown in a drawing by a symbolic expression. Further, when the electronic component 1 is a coil component, the electronic component body 2 is formed from, for example, magnetic ceramics such as Ni—Zn—Cu-based ferrite, and has a laminate structure, not shown in detail, provided by a plurality of ceramic layers 10. A direction of lamination of the laminate structure is directed to a lateral direction in FIG. 13.

External electrodes 11 and 12 electrically connected to the above-mentioned coil conductor 9 are formed on the electronic component body 2. At least parts of the external electrodes 11 and 12, that is, surface layers of the external electrodes 11 and 12 are provided by plating films 13 and 14, respectively, formed by electrolytic plating, in an example shown in the illustration. In order to form such plating films 13 and 14, a seed electrode serving as a starting point of plating growth are formed so as to constitute a ground of the plating films 13 and 14 as described in, for example, Japanese Patent Laid-open Publication No. 11-67554.

The seed electrode includes end surface underlying electrodes 15 and 16 formed on end surfaces 7 and 8, respectively, of the electronic component body 2, and a plurality of side surface underlying electrodes 17 and a plurality of side surface underlying electrodes 18 formed so as to extend in parallel with the end surfaces 7 and 8, respectively, in the side surfaces 3 to 6.

The end surface underlying electrodes 15 and 16 are formed by applying the electroconductive paste onto the end surfaces 7 and 8 and firing the paste.

The side surface underlying electrodes 17 and 18 are formed in an electronic component body 2 obtained undergoing a firing step by having screened an electroconductive paste film to become the side surface underlying electrodes 17 and 18 on specific ones of a plurality of ceramic green sheets to become a plurality of ceramic layers 10 which provide the laminate structure of the electronic component body 2.

Further, a plurality of side surface underlying electrodes 17 are electrically connected to one another, and the side surface underlying electrodes 17 are electrically connected to the end surface underlying electrode 15 with a connection conductor 19. Similarly, a plurality of side surface underlying electrodes 18 are electrically connected to one another, and the side surface underlying electrodes 18 are electrically connected to the end surface underlying electrode 16 with a connection conductor 20. The connection conductors 19 and 20 have the effect of enhancing a probability of causing a state of electric continuity to the seed electrode by contact of a conductive medium in performing electrolytic plating by a barrel plating method. The connection conductors 19 and 20 are formed, for example, by providing a through hole for specific ones of a plurality of ceramic green sheets to become a plurality of ceramic layers 10 which provide the laminate structure of the electronic component body 2, and filling the hole with the electroconductive paste.

In the electronic component 1 described above, noting end edges 21 and 22, respectively, of the plating films 13 and 14 providing surface layers of the external electrodes 11 and 12, each of the positions of the end edges 21 and 22 is determined depending on how far each of the plating films 13 and 14 grows along the side surfaces 3 to 6. In the degree of plating growth along these side surfaces 3 to 6, that is, a dimension of plating growth L, not a start point of plating growth but an end point of plating growth is important.

As an element of determining the above-mentioned dimension of plating growth L, there is a charge amount (current value×plating time) applied during electrolytic plating. Accordingly, conventionally, the charge amount applied for achieving a desired dimension of plating growth L has been set for every product to be produced, and the set charge amount has been applied to perform electrolytic plating during producing the product. However, even in the same product, there may be cases where such variations that the dimension of plating growth L varies with change in production lot have occurred between production lots.

It is desired that the dimension of plating growth L does not vary as far as possible. The reason for this is that the variations in dimension of plating growth L between a plurality of electronic components 1 can lead to variations in characteristics between a plurality of electronic components 1. For example, when the electronic component 1 is a coil component, if the dimension of plating growth L is too large, a degree of interference between a magnetic flux formed by the coil and the plating films 13 and 14 increases, and may have the effect on the characteristics of the electronic component 1. Further, variations in dimension of plating growth L may pose a defective appearance.

The variations in dimension of plating growth L are not limited to one which can occur between a plurality of electronic components 1. In one electronic component 1, as results of variations in dimension of plating growth L, linearity of the end edges 21 and 22 of the plating films 13 and 14 is impaired, and the end edges 21 and 22 may be typically formed in the shape of a wave, leading to a defective appearance.

SUMMARY

Problem to be Solved by the Disclosure

Thus, it is an object of the present disclosure to provide an electronic component having a structure capable of suppressing variations in dimension of plating growth of a plating film when at least part of an external electrode is provided by a plating film formed by a barrel plating method.

Means for Solving the Problem

The present disclosure is aimed at an electronic component which includes an electronic component body, underlying electrodes formed so as to be exposed to a plurality of points of an outer surface of the electronic component body, and external electrodes including plating films formed on the outer surface of the electronic component body by electrolytic plating using the underlying electrodes as a seed electrode serving as a starting point of plating growth, and the present disclosure is characterized by having the following constitution in order to solve the above-mentioned technical problem.

The above-mentioned underlying electrode includes an underlying main electrode and an underlying sub-electrode. The underlying sub-electrode is located along the specific end edge of the plating film, and the underlying main electrode is located away from the specific end edge of the plating film more distant than the underlying sub-electrode.

Further, in a stage prior to formation of the plating film, the underlying main electrodes are commonly electrically connected to one another, and the underlying main electrodes are not electrically connected to the underlying sub-electrode.

Moreover, an exposed area of the underlying sub-electrode which is exposed to the outer surface of the electronic component body is made smaller than an exposed area of the underlying main electrodes commonly electrically connected to one another which are exposed to the outer surface of the electronic component body.

When the barrel plating method is implemented, the underlying main electrode in which an area exposed to the outer surface of the electronic component body is larger performs power feeding by a conductive medium more frequently than the underlying sub-electrode in which the area exposed to the outer surface of the electronic component body is smaller. Accordingly, the plating growth provided by the underlying main electrode is more promoted than the plating growth provided by the underlying sub-electrode. In other words, the plating growth provided by the underlying sub-electrode which determines the dimension of plating growth at the specific end edge of the plating film, is more suppressed.

In a first preferred embodiment of the present disclosure, the electronic component body has a rectangular parallelepiped shape in which the outer surface is defined by four side surfaces and two end surfaces orthogonal to each of the four side surfaces, and the underlying electrode includes end surface underlying electrodes formed so as to be exposed to the two end surfaces of the electronic component body, respectively, and a plurality of side surface underlying electrodes formed so as to be exposed to at least one side surface of the electronic component body. The plating films are formed so as to extend on the two end surfaces of the electronic component body and from each of the two end surfaces to at least one side surface using the end surface underlying electrodes and a plurality of the side surface underlying electrodes serving as a seed electrode which is a starting point of plating growth. The underlying main electrodes are provided by first side surface underlying electrodes and the end surface underlying electrodes, the first side surface underlying electrodes being located away from the specific end edges of the plating films at a greater distance than the underlying sub-electrodes, among the side surface underlying electrodes, and the underlying sub-electrodes are provided by second side surface underlying electrodes, among the side surface underlying electrodes, located along the specific end edges of the plating films.

The first and the second side surface underlying electrodes are typically formed so as to go around four side surfaces.

The first and the second side surface underlying electrodes are preferably formed so as to extend in parallel with the end surfaces.

In the above case, in order to lengthen a dimension of plating growth, it is preferred to dispose a plurality of first side surface underlying electrodes extending in parallel with one another.

Electrical connection between the end surface underlying electrode and the first side surface underlying electrode may be achieved by interposing the inside of the electronic component body, or may be achieved by interposing the outer surface of the electronic component body.

Further, the first side surface underlying electrodes may be formed on the side surfaces so as to extend integrally from the end surface underlying electrodes on the outer surface of the electronic component body.

In a second preferred embodiment of the present disclosure, the electronic component body has a rectangular parallelepiped shape in which the outer surface is defined by four side surfaces and two end surfaces orthogonal to each of the four side surfaces, and the underlying electrode includes a plurality of side surface underlying electrodes formed so as to be exposed to at least one side surface of the electronic component body. The plating film is formed on at least one side surface of the electronic component body using a plurality of the side surface underlying electrodes serving as a seed electrode which is a starting point of plating growth. The underlying main electrodes are provided by first side surface underlying electrodes, among the side surface underlying electrodes, located away from the specific end edges of the plating films at a greater distance than the underlying sub-electrodes, and the underlying sub-electrodes are provided by second side surface underlying electrodes, among the side surface underlying electrodes, located along the specific end edges of the plating films.

In the second preferred embodiment, the first and the second side surface underlying electrodes are typically formed so as to be exposed to only one side surface, or formed so as to be exposed to both of neighboring two side surfaces.

When the first and the second side surface underlying electrodes are formed so as to be exposed to only one side surface like the former, preferably, an exposed portion of the side surface underlying electrode exposed to the side surface is provided by a plurality of line segment-like exposed portions extending in parallel with one another along the above-mentioned specific end edge, and a longitudinal dimension of the line segment-like exposed portion of the second side surface underlying electrode is made larger than a longitudinal dimension of the line segment-like exposed portion of the first side surface underlying electrode. By such a constitution, a corner portion formed at each of both ends of the specific end edge of the plating film can be brought into a more acute shape.

The electronic component according to the present disclosure typically further includes an internal conductor disposed inside the electronic component body. The internal conductor is electrically connected to the external electrodes.

Advantageous Effect of the Disclosure

According to the present disclosure, of the underlying main electrode and the underlying sub-electrode serving as starting points of plating growth of the plating film serving as at least part of the external electrode, the underlying sub-electrode has a smaller exposed area than that of the underlying main electrode, and the underlying sub-electrode is positioned along the specific end edge of the plating film and the underlying main electrode is positioned at a greater distance from the specific end edge of the plating film than the underlying sub-electrode, and therefore the underlying sub-electrode is lower in the degree of plating growth than the underlying main electrode, and therefore plating growth is suppressed by a position of the underlying sub-electrode. Therefore, it becomes easy to cause plating growth so that the vicinity of the underlying sub-electrode is an end point of plating growth, and consequently, variations in dimension of plating growth can be suppressed. Accordingly, in the electronic component according to the present disclosure, variations of its characteristics can be suppressed.

Further, according to the present disclosure, since the end point of plating growth is defined by the underlying sub-electrode and plating growth is suppressed at a position of the underlying sub-electrode, a shape of the end edge of the plating film almost follows a shape of the underlying sub-electrode. Accordingly, when the underlying sub-electrode has a shape of extending linearly, it is easy for the end edge of the plating film to have a shape of extending linearly following the underlying sub-electrode. Consequently, the electronic component can attain a good configuration in an appearance of the external electrode, and therefore implementing properties of the electronic component can be enhanced.

On the other hand, according to the present disclosure, since the plating growth provided by the underlying main electrode having a relatively large exposed area is more promoted than the plating growth provided by the underlying sub-electrode, the plating film can be formed efficiently on the underlying main electrode.

DETAILED DESCRIPTION

Figure 1:
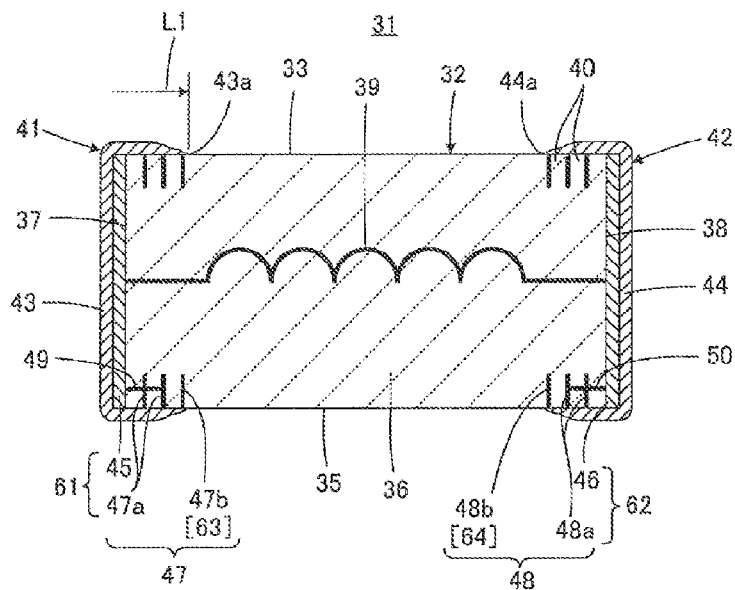
FIG. 1 is a sectional view schematically showing an electronic component 31 according to a first embodiment of the present disclosure.

In reference to FIG. 1 and FIG. 2, an electronic component 31 according to a first embodiment of the present disclosure will be described. The electronic component 31 shown in a drawing is aimed at a coil component.

The electronic component 31 includes a chip-shaped electronic component body 32 made of magnetic ceramics, for example, Ni—Zn—Cu-based ferrite. The electronic component body 32 has a cuboid shape in which an outside shape is defined by four side surfaces 33, 34, 35 and 36 (the side surface 34 is shown in FIG. 2, and the side surface 36 appears on a side opposite to the side surface 34) and two end surfaces 37 and 38.

The electronic component body 32, but not shown in detail, has a laminate structure provided by a plurality of ceramic layers 40. A direction of lamination of the laminate structure is directed to a lateral direction in FIG. 1.

A coil conductor 39 containing, for example, Ag, Cu or Pd as a conductive component is disposed inside the electronic component body 32. In addition, as with FIG. 13, in FIG. 1, the coil conductor 39 is schematically shown in a drawing by a symbolic expression. The coil conductor 39 extends in the form of a coil as a whole, and is actually composed of a line-like conductor extending between ceramic layers 40 and an interlayer connection conductor penetrating ceramic layers 40 in a thickness direction while being connected to an end part of each line conductor.

External electrodes 41 and 42 are formed on the electronic component body 32. At least parts of the external electrodes 41 and 42 are provided by plating films 43 and 44, respectively, formed by electrolytic plating. In addition, in the electronic component 31 shown in a drawing, the external electrodes 41 and 42 are composed of only the plating films 43 and 44, respectively. The plating films 33 and 34 are composed of, for example, Ni or Cu. In addition, the plating film may include a plurality of plating layers. Seed electrodes serving as starting points of plating growth are formed on the electronic component body 32 for forming plating films 43 and 44.

Figure 13:
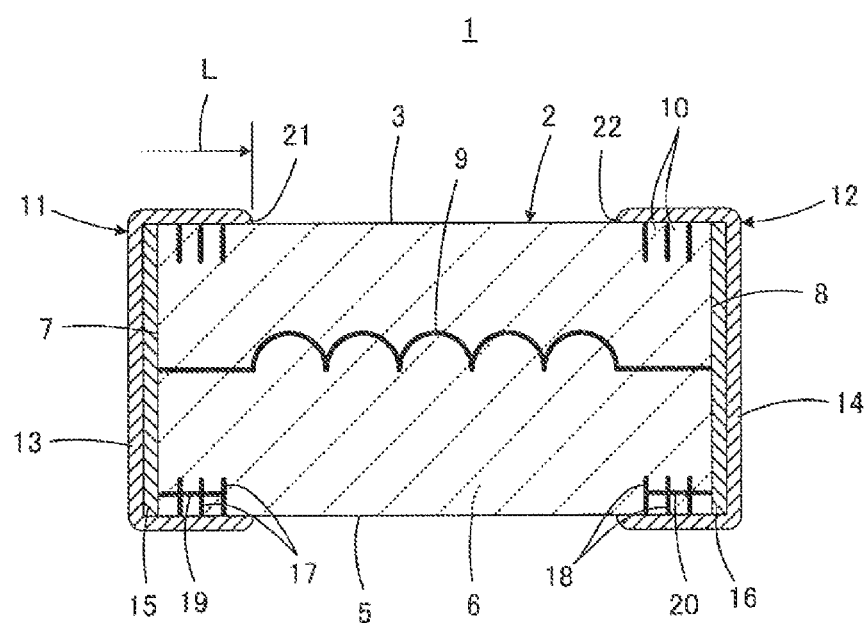
FIG. 13 is a sectional view schematically showing the electronic component 1 shown in FIG. 12.

As with the electronic component body 2 shown in FIG. 13, the seed electrode includes end surface underlying electrodes 45 and 46 formed on end surfaces 37 and 38, respectively, of the electronic component body 32, and a plurality of side surface underlying electrodes 47 and a plurality of side surface underlying electrodes 48 formed so as to extend in parallel with the end surfaces 37 and 38, respectively, in the side surfaces 33 to 36.

The end surface underlying electrodes 45 and 46 are formed by applying the electroconductive paste containing, for example, Ag or Cu as a conductive component onto the end surfaces 37 and 38 and firing the paste. The end surface underlying electrodes 45 and 46 shown in a drawing are formed on the whole area of the end surfaces 37 and 38, but it may be formed, for example, in the form of a mesh or a stripe, not on the whole area. End portions of the coil conductor 39 are electrically connected to the end surface underlying electrodes 45 and 46, respectively.

The side surface underlying electrodes 47 and 48 are formed in an electronic component body 32 obtained undergoing a firing step by having screened an electroconductive paste film to become the side surface underlying electrodes 47 and 48 on specific ones of a plurality of ceramic green sheets to become a plurality of ceramic layers 40 which provide the laminate structure of the electronic component body 32. The side surface underlying electrodes 47 and 48 shown in a drawing are formed so as to go around four side surfaces 33 to 36.

The side surface underlying electrodes 47 and 48 include a plurality of first side surface underlying electrodes 47a and a plurality of first side surface underlying electrodes 48a, and second side surface underlying electrodes 47b and 48b, respectively, which are positioned at a greater distance from the end surfaces 37 and 38, respectively, than the first side surface underlying electrodes 47a and 48a, in other words, which are positioned on the most inner side.

The underlying electrodes 45 to 48 composed of the end surface underlying electrodes 45 and 46 and the side surface underlying electrodes 47 and 48 are classified into underlying main electrodes 61 and 62 and underlying sub-electrodes 63 and 64. Here, the underlying sub-electrodes 63 and 64 are positioned along the end edges 43a and 44a of the plating films 43 and 44, respectively, and the above-mentioned second side surface underlying electrodes 47b and 48b correspond to these. On the other hand, the underlying main electrodes 61 and 62 are positioned at a greater distance from the end edges 43a and 44a of the plating films 43 and 44, respectively, than the underlying sub-electrodes 63 and 64, and the above-mentioned first side surface underlying electrodes 47a and 48a and the end surface underlying electrodes 45 and 46 correspond to these.

Figure 2:
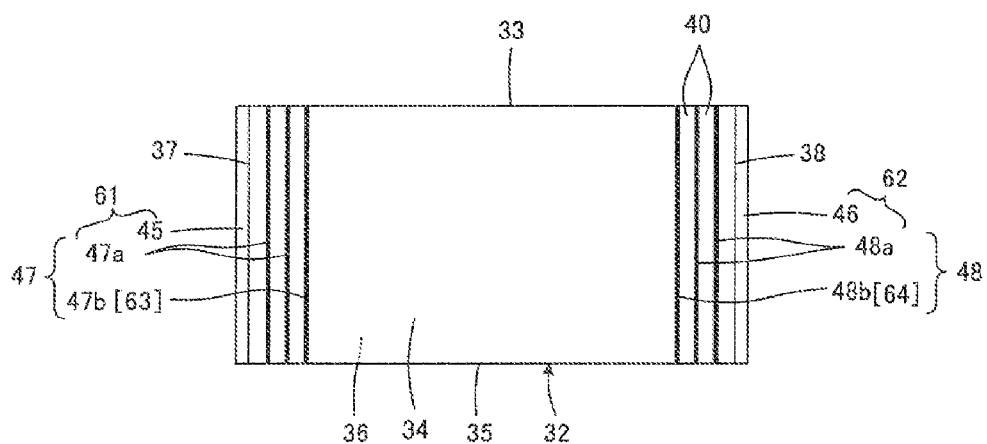
FIG. 2 is a front view showing an electronic component body 32 included in the electronic component 31 shown in FIG. 1.

As shown in FIG. 1, a plurality of the first side surface underlying electrodes 47a and a plurality of the first side surface underlying electrodes 48a exist, and one second side surface underlying electrode 47b and one second side surface underlying electrode 48b exist. Accordingly, the areas of first side surface underlying electrodes 47a and 48a exposed to the side surfaces 33, 34, 35 and 36 of the electronic component body 32 are larger than the areas of second side surface underlying electrodes 47b and 48b.

Moreover, comparing exposed areas between the underlying main electrodes 61 and 62 and the underlying sub-electrodes 63 and 64, exposed areas of the underlying main electrodes 61 and 62 are predominantly larger than those of the underlying sub-electrodes 63 and 64 since the underlying main electrodes 61 and 62 respectively include the end surface underlying electrodes 45 and 46 in addition to the first side surface underlying electrodes 47a and 48a.

The plurality of first side surface underlying electrodes 47a are electrically connected to one another, and electrically connected to the end surface underlying electrode 45 with at least one connection conductor 49. Similarly, the plurality of first side surface underlying electrodes 48a are electrically connected to one another, and electrically connected to the end surface underlying electrode 46 with at least one connection conductor 50. Consequently, each of the underlying main electrodes 61 and 62 is commonly in a state of being electrically connected to one another.

The connection conductors 49 and 50 are provided by a via-hole conductor formed, for example, by providing a through hole for specific ones of a plurality of ceramic green sheets to become a plurality of ceramic layers 40 which provide the laminate structure of the electronic component body 32, and filling the hole with the electroconductive paste. In this way, electrical connection between the end surface underlying electrodes 45, 46 and the first side surface underlying electrodes 47a, 48a, respectively, and electrical connection between the first side surface underlying electrodes 47a and between the first side surface underlying electrodes 48a are achieved by interposing the inside of the electronic component body 32.

On the other hand, the underlying sub-electrodes 63 and 64 provided by the second side surface underlying electrodes 47b and 48b are not electrically connected to the underlying main electrodes 61 and 62, respectively, in a stage prior to formation of the plating films 43 and 44.

As the electroconductive paste used for formation of the side surface underlying electrodes 47 and 48 and the connection conductors 49 and 50, for example, a paste containing Ag or Cu as a conductive component is used.

Figure 3:
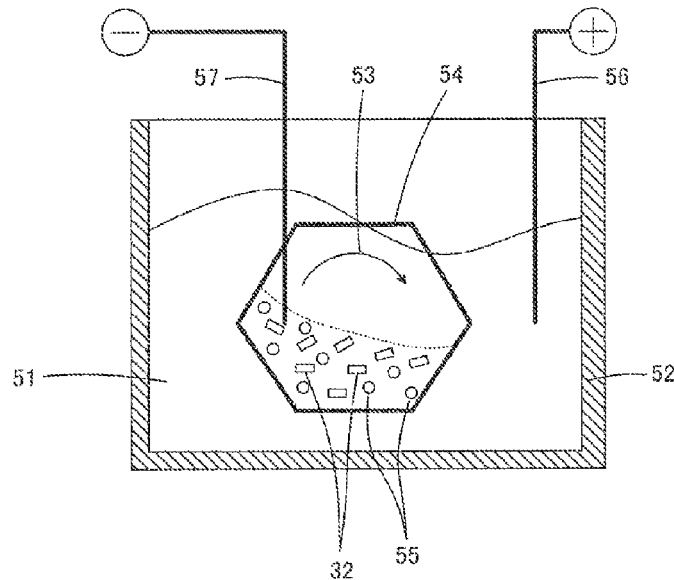
FIG. 3 is a front view showing in diagrammatic form a state of applying electrolytic plating by a barrel plating method to the electronic component body 32 shown in FIG. 2.

FIG. 3 shows in diagrammatic form a state of applying electrolytic plating by the barrel plating method to the electronic component body 32. A barrel 54 which rotates in a direction of an arrow 53 is arranged in a plating bath 52 containing an electrolyte solution 51. A plurality of electronic component bodies 32 which are a subject for electrolytic plating are loaded into the barrel 54 together with a plurality of conductive media 55. In the electrolyte solution 51, an anode 56 is arranged, and a cathode 57 is arranged so that the cathode can be brought into contact with the media 55 in the barrel 54.

According to the barrel plating method, by the rotation of the barrel 54, electronic component bodies 32 and the media 55 in the barrel 54 are stirred, and by this stirring, the contact of the media 55 with the end surface underlying electrodes 45 and 46 as a seed electrode and the side surface underlying electrodes 47 and 48 are promoted. A current is passed through the end surface underlying electrodes 45 and 46 and the side surface underlying electrodes 47 and 48 during the medium 55 contacts with these electrodes, and electrolytic plating proceeds using these electrodes as a seed electrode.

The dimension of plating growth which the plating films 43 and 44 providing the above-mentioned external electrodes 41 and 42 have, is expressed by "L1" in FIG. 1. A relation between the exposed areas and a configuration of electrical connection employed in the underlying main electrodes 61 and 62 and the underlying sub-electrodes 63 and 64 act to suppress variations in dimension of plating growth L1, that is, variations in positions of the end edges 43a and 44a of the plating films 43 and 44.

When the barrel plating method, as shown in FIG. 3, is implemented, the underlying main electrodes 61 and 62 perform power feeding by a medium 55 more frequently than the underlying sub-electrodes 63 and 64. Accordingly, the plating growth provided by the underlying main electrodes 61 and 62 is more promoted than the plating growth provided by the underlying sub-electrodes 63 and 64. In other words, the plating growth provided by the second side surface underlying electrodes 47b and 48b as the underlying sub-electrodes 63 and 64 which are positioned on the most inner side and determines the dimension of plating growth L1, is more suppressed.

Therefore, it becomes easy to cause plating growth so that the vicinities of the side surface underlying electrodes 47b and 48b are the end edges 43a and 44a of the plating films 43 and 44, and consequently, variations in dimension of plating growth can be suppressed. Accordingly, in the electronic component 31 obtained undergoing such a plating step, variations of its characteristics can be suppressed.

Further, since the end point of plating growth is defined by the second side surface underlying electrodes 47b and 48b, shapes of the end edges 43a and 44a of the plating films 43 and 44 follow shapes of the second side surface underlying electrodes 47b and 48b.

Accordingly, since the second side surface underlying electrodes 47b and 48b has a shape of extending linearly, the end edges 43a and 44a of the plating films 43 and 44 can also have a shape of extending linearly following the second side surface underlying electrode. Consequently, the electronic component can attain good configuration in an appearance of the external electrodes 41 and 42, and therefore implementing properties of the electronic component 31 can be enhanced.

On the other hand, since the plating growth provided by the underlying main electrodes 61 and 62 is more promoted than the plating growth provided by the underlying sub-electrodes 63 and 64, the plating films 43 and 44 can be grown efficiently on the underlying main electrodes 61 and 62.

Figure 4:
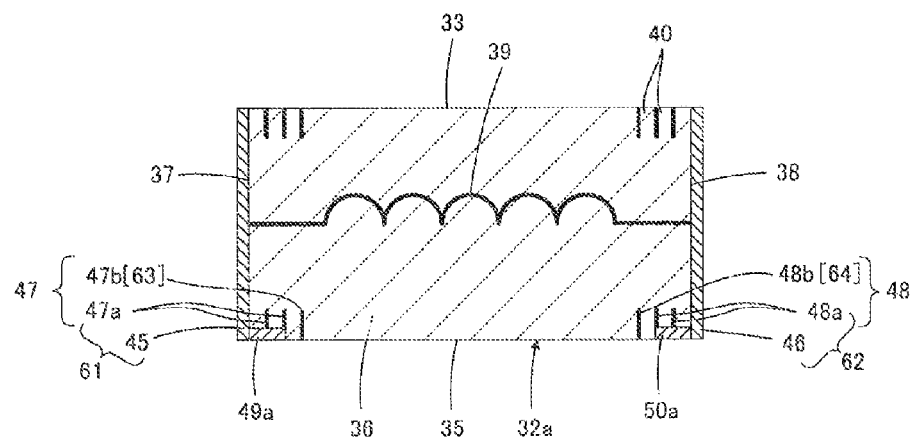
FIG. 4 is a sectional view schematically showing an electronic component body 32a included in the electronic component according to a second embodiment of the present disclosure.

Next, in reference to FIG. 4, a second embodiment of the present disclosure will be described. In FIG. 4, an electronic component body 32a included in the electronic component is schematically shown by a sectional view. In FIG. 4, elements corresponding to the elements shown in FIG. 1 or 2 are given like reference symbols, and overlapping description will be omitted.

In the electronic component body 32a shown in FIG. 4, it is characterized in that the first side surface underlying electrodes 47a and 48a are electrically connected to the end surface underlying electrodes 45 and 46 with the outer surface of the electronic component body 32a interposed. More specifically, the first side surface underlying electrodes 47a and 48a are electrically connected to the end surface underlying electrodes 45 and 46, respectively, with at least one connection conductor 49a and at least one connection conductor 50a interposed, the connection conductors 49a and 50a respectively disposed in a state of being exposed to the outer surface of the electronic component body 32a, and the first side surface underlying electrodes 47a are electrically connected to one another and the first side surface underlying electrodes 48a are electrically connected to one another.

Also according to the second embodiment, the same effect as in the above first embodiment is achieved. In addition, in the second embodiment, the connection conductors 49a and 50a also increase the exposed areas of the underlying main electrodes 61 and 62, respectively, more or less.

The above-mentioned connection conductors 49a and 50a are formed, for example, in the following way. That is, a via hole conductor has been disposed in a set of electronic component bodies from which a plurality of electronic component bodies 32a can be taken out by dividing, the set of electronic component bodies is divided so as to divide the via hole conductor into two portions. Then, when the plurality of electronic component bodies 32a are taken out, connection conductors 49a and 50a are formed in the form of dividing the via hole conductor into two on the outer surface of the taken out electronic component body 32a. The above-mentioned via hole conductor can be formed by providing a through hole for specific ones of a plurality of ceramic green sheets which provide the laminate structure in the set of the electronic component bodies, and filling the hole with the electroconductive paste.

When the above-mentioned method is employed in order to form the connection conductors 49a and 50a, a reduction of processing cost can be expected.

Figure 5:
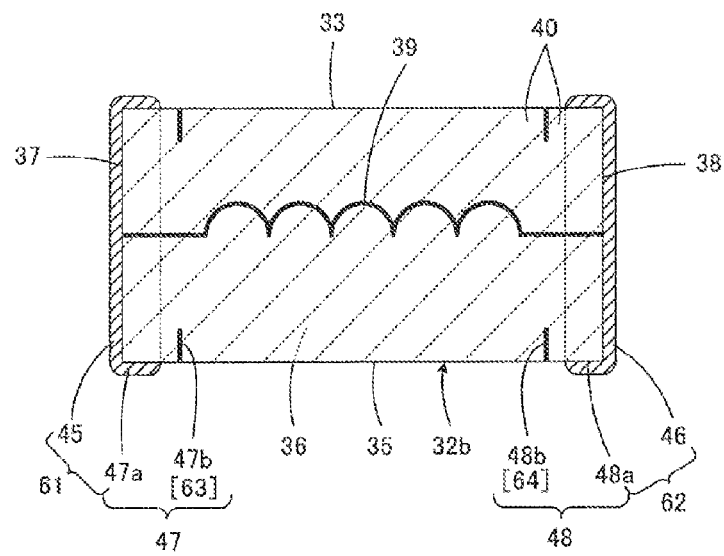
FIG. 5 is a sectional view schematically showing an electronic component body 32b included in the electronic component according to a third embodiment of the present disclosure.

Next, in reference to FIG. 5, a third embodiment of the present disclosure will be described. In FIG. 5, an electronic component body 32b included in the electronic component is schematically shown by a sectional view. In FIG. 5, elements corresponding to the elements shown in FIG. 1 or 2 are given like reference symbols, and overlapping description will be omitted.

In the electronic component body 32b shown in FIG. 5, it is characterized in that the first side surface underlying electrodes 47a and 48a are formed on the side surfaces 33 to 36 so as to extend integrally from the end surface underlying electrodes 45 and 46, respectively, on the outer surface of the electronic component body 32b, and thereby, the first side surface underlying electrodes 47a and 48a are electrically connected to the end surface underlying electrodes 45 and 46, respectively. In this way, each of the underlying main electrodes 61 and 62 composed of the end surface underlying electrodes 45 and 46, respectively, and the first side surface underlying electrodes 47a and 48a, respectively, is composed of an integral conductor film.

Also according to the third embodiment, the same effect as in the above first embodiment is achieved.

The above-mentioned first side surface underlying electrodes 47a can be formed together with the end surface underlying electrode 45 by firing an electroconductive paste provided on the electronic component body 32b by a dipping method. Similarly, the first side surface underlying electrodes 48a can be formed together with the end surface underlying electrode 46 by firing an electroconductive paste provided on the electronic component body 32b by a dipping method.

When the above-mentioned method is employed in order to form the first side surface underlying electrodes 47a and 48a, a reduction of the number of processes can be expected.

A method of forming the second side surface underlying electrodes 47b and 48b to become the underlying sub-electrodes 63 and 64 is the same as in the first embodiment.

Figure 6:
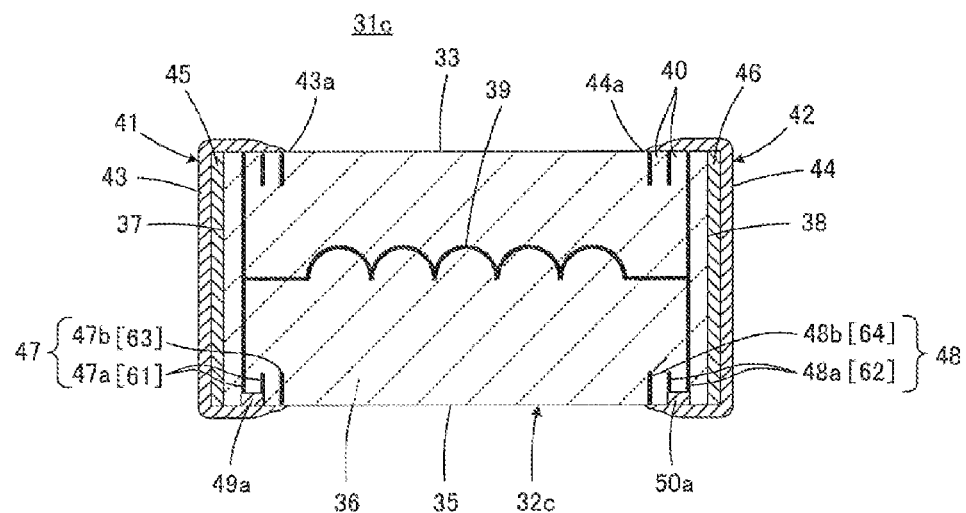
FIG. 6 is a sectional view schematically showing an electronic component 31c according to a fourth embodiment of the present disclosure.

Next, in reference to FIG. 6, a fourth embodiment of the present disclosure will be described. In FIG. 6, an electronic component 31c is schematically shown by a sectional view. In FIG. 6, elements corresponding to the elements shown in FIG. 1 are given like reference symbols, and overlapping description will be omitted.

In an electronic component body 32c included in the electronic component 31c shown in FIG. 6, end portions of the coil conductor 39 are electrically connected to any one of a plurality of first side surface underlying electrodes 47a and any one of a plurality of first side surface underlying electrodes 48a, respectively. Further, connection conductors 49a and 50a connect between the plurality of first side surface underlying electrodes 47a and between the plurality of first side surface underlying electrodes 48a, respectively, but are not connected to end surface underlying electrodes 45 and 46, respectively.

In the electronic component 31c shown in FIG. 6, the underlying main electrodes 61 and 62 are respectively provided by the plurality of first side surface underlying electrodes 47a and the plurality of first side surface underlying electrodes 48a, and the underlying sub-electrodes 63 and 64 are respectively provided by the second side surface underlying electrodes 47b and 48b.

A plurality of the first side surface underlying electrodes 47a and a plurality of the first side surface underlying electrodes 48a exist, and one second side surface underlying electrode 47b and one second side surface underlying electrode 48b exist. Accordingly, the areas of first side surface underlying electrodes 47a and 48a exposed to the side surfaces 33, 34, 35 and 36 of the electronic component body 32 are larger than the areas of second side surface underlying electrodes 47b and 48b. In other words, the exposed area of the underlying main electrodes 61 and 62 is larger than that of the underlying sub-electrodes 63 and 64.

In the electronic component 31c shown in FIG. 6, the end surface underlying electrodes 45 and 46 are not electrically connected to the underlying main electrodes 61 and 62, respectively, in a stage prior to formation of the plating films 43 and 44, but they serve as underlying electrodes performing the functions equal to the underlying main electrodes 61 and 62.

In the embodiments described above, the external electrodes 41 and 42 are formed so as to extend up to four side surfaces 33 to 36 of each of electronic component bodies 32, 32a, 32b and 32c; however, the external electrodes 41 and 42 may be formed so as to extend up to only three side surfaces, opposed two side surfaces or neighboring two side surfaces, or one side surface. Accordingly, plating films 43 and 44 may also be formed so as to extend up to only three side surfaces, opposed two side surfaces or neighboring two side surfaces, or one side surface, and according to this, side surface underlying electrodes may also be formed so as to be exposed to only three side surfaces, opposed two side surfaces or neighboring two side surfaces, or one side surface. Further, the present disclosure can be applied to an electronic component in which the external electrodes are formed so as to extend from a part of the end surface of the electronic component body up to only a part of one side surface.

Figure 7:
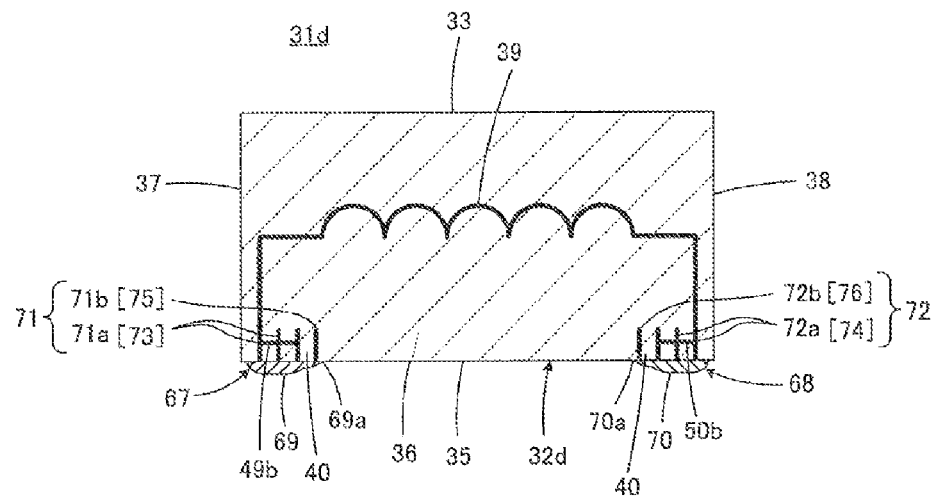
FIG. 7 is a sectional view schematically showing an electronic component 31d according to a fifth embodiment of the present disclosure.
Figure 8:
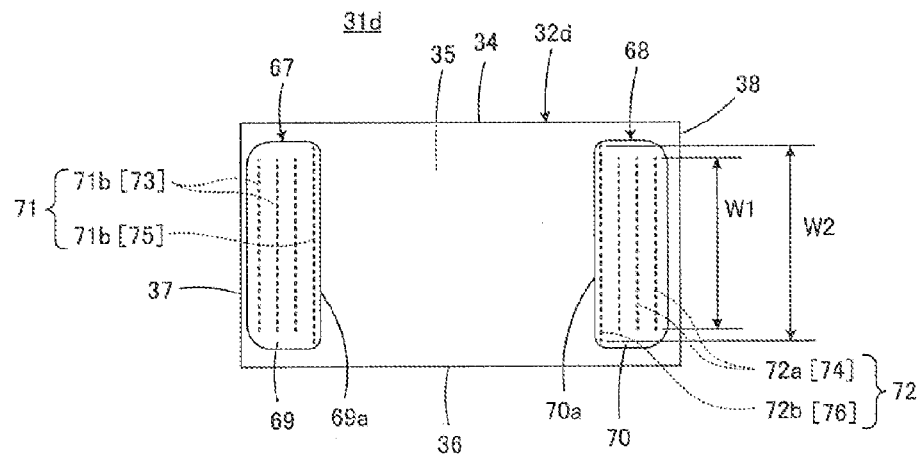
FIG. 8 is a bottom view of the electronic component 31d shown in FIG. 7.

In reference to FIG. 7 and FIG. 8, a fifth embodiment of the present disclosure will be described. In FIG. 7, the electronic component 31d is schematically shown by a sectional view, and in FIG. 8, the electronic component 31d shown in FIG. 7 is shown by a bottom view. In FIG. 7 and FIG. 8, elements corresponding to the elements shown in FIG. 1 are given like reference symbols, and overlapping description will be omitted.

The electronic component 31d shown in FIG. 7 and FIG. 8 is characterized in that external electrodes 67 and 68 are formed on only one side surface 35 corresponding to a bottom surface of the electronic component body 32d. The external electrodes 67 and 68 include plating films 69 and 70, respectively, formed by electrolytic plating. Seed electrodes serving as starting points of plating growth are formed on the electronic component body 32d for forming plating films 69 and 70.

The seed electrode includes a plurality of side surface underlying electrodes 71 and a plurality of side surface underlying electrodes 72 formed so as to be exposed to the side surface 35 of the electronic component body 32d corresponding to the plating films 69 and 70, respectively. The side surface underlying electrodes 71 and 72 can be formed by the same method as in the above-mentioned side surface underlying electrodes 47 and 48. The side surface underlying electrodes 71 and 72, as shown in FIG. 8, is provided by a plurality of line segment-like exposed portions extending in parallel with one another.

The side surface underlying electrodes 71 and 72 include a plurality of first side surface underlying electrodes 71a and a plurality of first side surface underlying electrodes 72a, and second side surface underlying electrodes 71b and 72b, respectively, which are positioned at a greater distance than those of these first side surface underlying electrodes 71a and 72a from the end surfaces 37 and 38, respectively, in other words, which are positioned on the most inner side.

These side surface underlying electrodes 71 and 72 are classified into underlying main electrodes 73 and 74 and underlying sub-electrodes 75 and 76. Here, the underlying sub-electrodes 75 and 76 are positioned along the specific end edges, that is, end edges opposed to each other 69a and 70a of the plating films 69 and 70, respectively, and the above-mentioned second side surface underlying electrodes 71b and 72b correspond to these. On the other hand, the underlying main electrodes 73 and 74 are positioned at a greater distance from the specific end edges 69a and 70a of the plating films 69 and 70, respectively, than the underlying sub-electrodes 75 and 76, and the above-mentioned first side surface underlying electrodes 71a and 72a correspond to these.

As shown in FIG. 7 and FIG. 8, a plurality of the first side surface underlying electrodes 71a and a plurality of the first side surface underlying electrodes 72a exist, and one second side surface underlying electrode 71b and one second side surface underlying electrode 72b exist. Accordingly, the exposed areas of the underlying main electrodes 73 and 74 respectively provided by the areas of first side surface underlying electrodes 71a and 72a exposed to the side surface 35 of the electronic component body 32d are larger than the exposed areas of the underlying sub-electrode 75 and 76 respectively provided by the areas of second side surface underlying electrodes 71b and 72b.

The plurality of first side surface underlying electrodes 71a are, as shown in FIG. 7, electrically connected to one another with at least one connection conductor 49b. Similarly, the plurality of first side surface underlying electrodes 72a are electrically connected to one another with at least one connection conductor 50b. Consequently, each of the underlying main electrodes 73 and 74 is commonly in a state of being electrically connected to one another. The connection conductors 49b and 50b can be formed by the same method as in the case of the connection conductors 49 and 50 shown in FIG. 1. The connection conductors 49b and 50b may be disposed in the same configuration as in the case of the connection conductors 49a and 50a shown in FIG. 4.

On the other hand, the underlying sub-electrodes 75 and 76 provided by the second side surface underlying electrodes 71b and 72b are not electrically connected to the underlying main electrodes 73 and 74, respectively, in a stage prior to formation of the plating films 69 and 70.

Further, in the electronic component 31d, end portions of the coil conductor 39 as the internal conductor disposed inside the electronic component body 32d, are electrically connected to the external electrodes 67 and 68, respectively, by being electrically connected to any one of the first side surface underlying electrodes 71a and any one of the first side surface underlying electrodes 72a, respectively.

When applying electrolytic plating by the barrel plating method to the electronic component body 32d described above, a current is passed through the side surface underlying electrodes 71 and 72 during a conductive medium 55 (refer to FIG. 3) in contact with the side surface underlying electrodes 71 and as seed electrodes, and electrolytic plating proceeds using these electrodes as a seed electrode. Here, the underlying main electrodes 73 and 74 perform power feeding by a medium 55 more frequently than the underlying sub-electrodes 75 and 76. Accordingly, the plating growth provided by the underlying main electrodes 73 and 74 is more promoted than the plating growth provided by the underlying sub-electrodes 75 and 76. In other words, the plating growth provided by the second side surface underlying electrodes 71*b* and 72*b* as the underlying sub-electrodes 75 and 76 which are positioned along the specific end edges 69*a* and 70*a* of the plating films 69 and 70 to be formed, is more suppressed.

Therefore, it becomes easy to cause plating growth so that the vicinities of the second side surface underlying electrodes 71*b* and 72*b* are the end edges 69*a* and 70*a* of the plating films 69 and 70, and consequently, variations in positions of the end edges 69*a* and 70*a* can be suppressed. Since the plating films 69 and 70, that is, the end edges 69*a* and 70*a* of the external electrodes 67 and 68 are positioned opposite to each other, the positions of the end edges 69*a* and 70*a* have a relatively large effect on characteristics and implementing properties of the electronic component 31*d*. According to the electronic component 31*d* shown in FIG. 7 and FIG. 8, since variations in positions of the end edges 69*a* and 70*a* can be suppressed, it is possible to suppress the variations of characteristics and enhance implementing properties.

The electronic component 31*d* is also characterized in that as shown by a broken line in FIG. 8, a longitudinal dimension W2 of the line segment-like exposed portion of each of the second side surface underlying electrodes 71*b* and 72*b* is larger than a longitudinal dimension W1 of the line segment-like exposed portion of each of the first side surface underlying electrodes 71*a* and 72*a*. Since in this way, a dimensional relationship between the first side surface underlying electrodes 71*a* and 72*a* and the second side surface underlying electrodes 71*b* and 72*b* is selected, corner portions formed at both ends of each of the inner end edges 69*a* and 70*a* of the plating films 69 and 70, by extension, the external electrodes 67 and 68, can be brought into a more acute shape.

The present disclosure is not limited to the electronic component in which the number of the external electrodes is 2, and can also be applied to electronic components having three or more external electrodes such as an array type electronic component.

Figure 9:
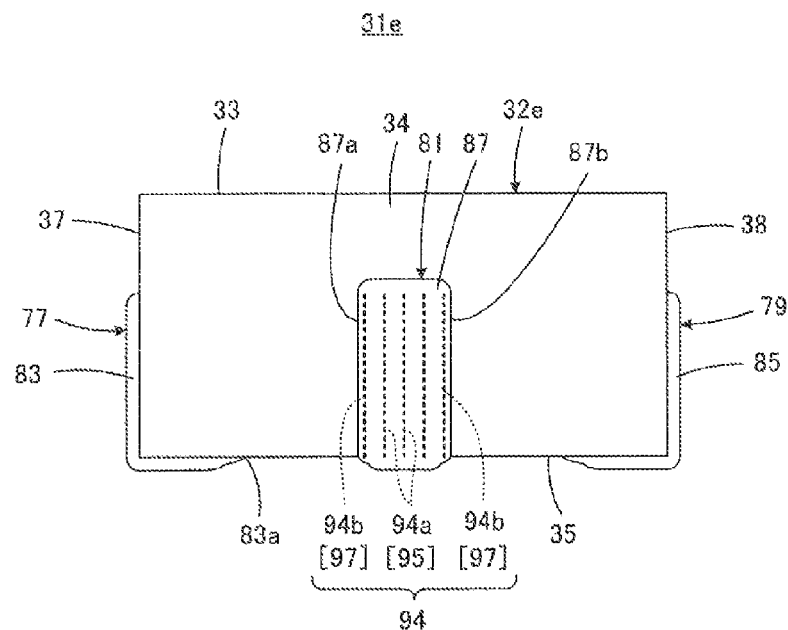
FIG. 9 is a front view showing an electronic component 31e according to a sixth embodiment of the present disclosure.
Figure 10:
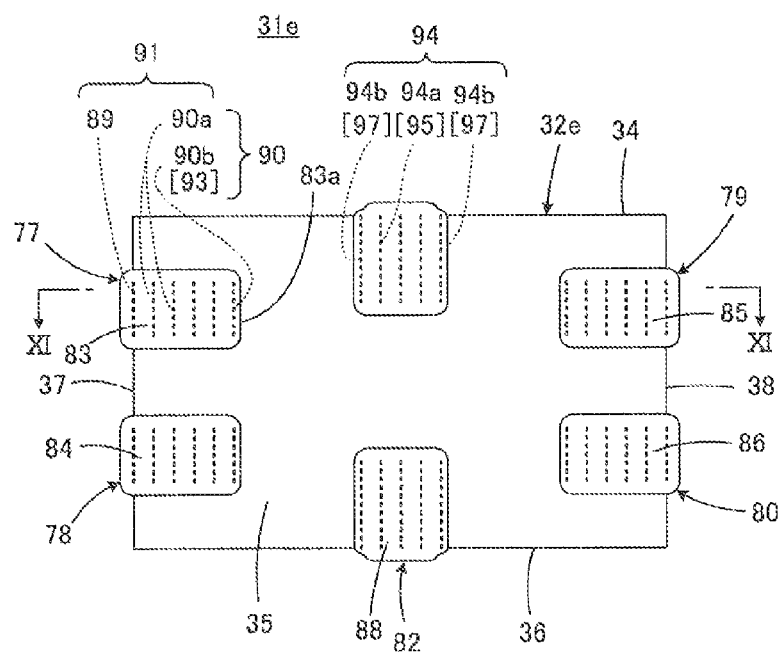
FIG. 10 is a bottom view of the electronic component 31e shown in FIG. 9.
Figure 11:
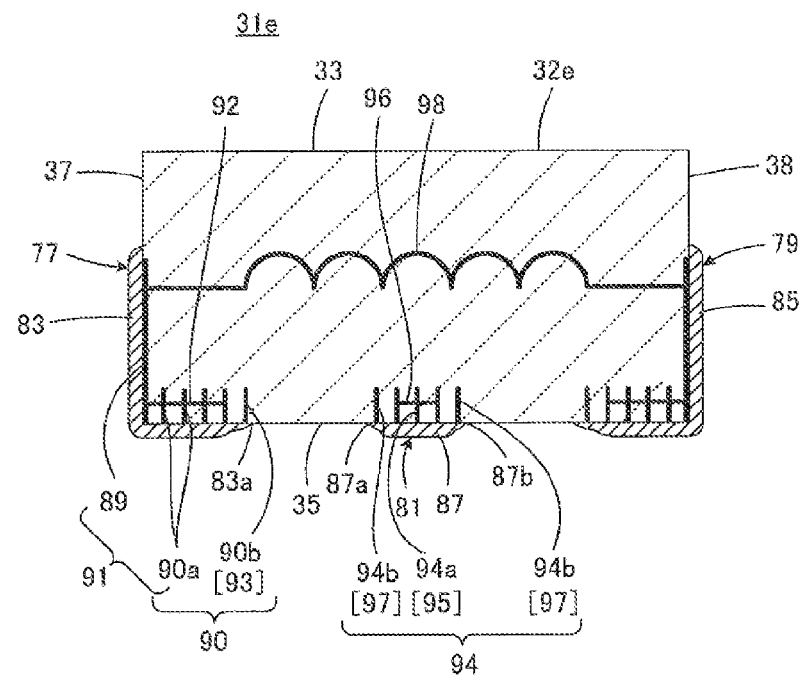
FIG. 11 is a schematic sectional view taken on line XI-XI in FIG. 10 of the electronic component 31e of FIG. 9.
Figure 12:
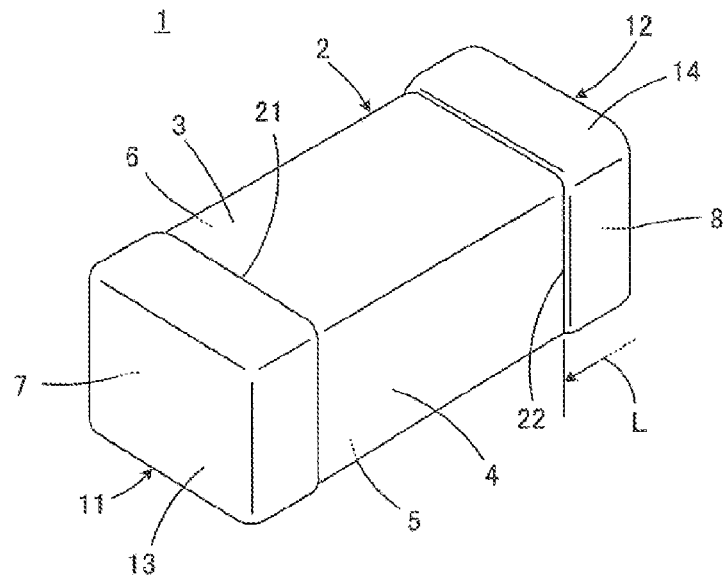
FIG. 12 is a perspective view showing an appearance of an electronic component 1 of interest to the present disclosure.

Next, in reference to FIGS. 9 to 11, a sixth embodiment of the present disclosure will be described. The electronic component 31*e* according to the sixth embodiment is shown by a front view in FIG. 9, by a bottom view in FIG. 10, and by a sectional view taken on line XI-XI in FIG. 10 in FIG. 11. In FIG. 9 to FIG. 11, elements corresponding to the elements shown in FIG. 1 are given like reference symbols, and overlapping description will be omitted.

The electronic components 31*e* shown in FIG. 9 to FIG. 11 are characterized in that six external electrodes 77 to 82 are formed on an outer surface of the electronic component body 32*e*. The external electrodes 77 to 82 include plating films 83 to 88, respectively, formed by electrolytic plating. The plating films 83 and 84 are formed so as to extend from a side surface 35 constituting a bottom surface of the electronic component body 32*e* up to an end surface 37 of the electronic component body 32*e*. The plating films 85 and 86 are formed so as to extend from the side surface 35 up to the end surface 38. The plating film 87 is formed so as to extend from the side surface 35 up to a side surface 34, and the plating film 88 is formed so as to extend from the side surface 35 up to a side surface 36.

Seed electrodes serving as starting points of plating growth are formed on the electronic component body 32*e* for forming plating films 83 to 88.

Describing the seed electrode for the plating film 83, the seed electrode includes an end surface underlying electrode 89 and side surface underlying electrodes 90. The side surface underlying electrodes 90 are classified into a plurality of first side surface underlying electrodes 90*a* positioned at a distance from the specific end edge 83*a* of the plating film 83, and a second side surface underlying electrodes 90*b* positioned along the specific end edge 83*a* of the plating film 83. An underlying main electrode 91 for the plating film 83 is provided by the end surface underlying electrode 89 and a plurality of first side surface underlying electrodes 90*a* electrically connected with a connection conductor 92, and an underlying sub-electrode 93 is provided by the second side surface underlying electrodes 90*b*.

A seed electrode for each of the plating films 84 to 86 has substantially the same constitution as that of the seed electrode for the plating film 83, overlapping description will be omitted.

On the other hand, a seed electrode for the plating film 87 includes a plurality of side surface underlying electrodes 94. The side surface underlying electrodes 94 are classified into a plurality of first side surface underlying electrodes 94*a* positioned at a distance from the specific end edges 87*a* and 87*b* of the plating film 87, and a second side surface underlying electrodes 94*b* positioned along the specific end edges 87*a* and 87*b* of the plating film 87. An underlying main electrode 95 for the plating film 87 is provided by a plurality of first side surface underlying electrodes 94*a* electrically connected to one another with a connection conductor 96, and an underlying sub-electrode 97 is provided by the second side surface underlying electrodes 94*b*.

A seed electrode for the plating film 88 has substantially the same constitution as that of the seed electrode for the plating film 87, overlapping description will be omitted.

A coil conductor 98 as the internal conductor is disposed inside the electronic component body 32*e*, and end portions of the coil conductor 98 are electrically connected to the end surface underlying electrode 89 as the seed electrode for the plating film 83 and the end surface underlying electrode as the seed electrode for the plating film 85. Diagrammatical expression and description of other internal conductors disposed inside the electronic component body 32*e* and the connection formed between the internal conductors and the external electrodes 77 to 82, will be omitted.

Also in the sixth embodiment, the condition that the exposed areas of the underlying main electrodes 91 and 95 are larger than the exposed areas of the underlying sub-electrodes 93 and 97 respectively is satisfied.

Up to this point, the electronic component which is a subject for the present disclosure has been described taking a coil component as an example. In the case of the coil component, the electronic component body 32 is made of a ferrite material, and the ferrite material is lower in surface resistance than a dielectric material constituting an electronic component body in the case of a multilayer ceramic capacitor, for example. Therefore, it can be supposed that a range of variations in dimension of plating growth of the ferrite material is larger than the dielectric material. In this point, the present disclosure is more significant when applying to a coil component than when applying to a multilayer ceramic capacitor.

However, the present disclosure can be applied to other ceramic electronic components such as a multilayer ceramic capacitor and a thermistor beyond a coil component, and further to electronic components other than the ceramic electronic components.

Further, a number of the side surface underlying electrodes serving as the underlying main electrode, shown in a drawing, was set to a relatively small number for the ease of preparation of drawings, but actually more side surface underlying electrodes are used. On the other hand, a number of the side surface underlying electrodes serving as the underlying sub-electrode is one per an end edge of the plating film, as shown in the drawings; however, two or more underlying sub-electrodes may be used, as required. Further, a difference in the exposed area between the underlying main electrode and the underlying sub-electrode may be effected by a difference in thickness between the side surface underlying electrodes.

In the explanations of embodiments shown in drawings, names "side surface" and "end surface" have been used for the outer surface of the electronic component body having a cuboid shape; however, the "side surface" and "end surface" are relatively determined, and a choice of "side surface" or "end surface" is arbitrary.

Further, in embodiments shown in the drawings, the electronic component body is cuboid-shaped, this description can be applied to electronic components having a cylindrical shape and a disk shape other than the cuboid shape.

The invention claimed is:

1. An electronic component comprising:
an electronic component body;
underlying electrodes formed so as to be exposed at a plurality of points of an outer surface of the electronic component body;
and external electrodes including plating films formed on the outer surface of the electronic component body by electrolytic plating using the underlying electrodes as a seed electrode serving as a starting point of plating growth,
wherein the underlying electrodes include underlying main electrodes and underlying sub-electrodes, the underlying sub-electrodes are located along specific end edges of the plating films, the underlying main electrodes are located away from the specific end edges of the plating films at a greater distance than the underlying sub-electrodes,
in a stage prior to formation of the plating film, the underlying main electrodes are commonly electrically connected to one another, and the underlying main electrodes are not electrically connected to the underlying sub-electrode, and
an exposed area of the underlying sub-electrode which is exposed to the outer surface of the electronic component body is made smaller than an exposed area of the underlying main electrodes commonly electrically connected to one another which are exposed to the outer surface of the electronic component body.

2. The electronic component according to claim 1,
wherein the electronic component body has a rectangular parallelepiped shape in which the outer surface is defined by four side surfaces and two end surfaces orthogonal to each of the four side surfaces,
the underlying electrode includes end surface underlying electrodes formed so as to be exposed to the two end surfaces, respectively, of the electronic component body, and a plurality of side surface underlying electrodes formed so as to be exposed to at least one side surface of the electronic component body,
the plating films are formed so as to extend on the two end surfaces of the electronic component body and from each of the two end surfaces to at least one side surface using the end surface underlying electrodes and a plurality of the side surface underlying electrodes serving as a seed electrode which is a starting point of plating growth,
the underlying main electrodes are provided by first side surface underlying electrodes and the end surface underlying electrodes, the first side surface underlying electrodes being located away from the specific end edges of the plating films at a greater distance than the underlying sub-electrodes, among the side surface underlying electrodes, and
the underlying sub-electrodes are provided by second side surface underlying electrodes, among the side surface underlying electrodes, located along the specific end edges of the plating films.

3. The electronic component according to claim 2, wherein the first and the second side surface underlying electrodes are formed so as to go around four side surfaces.

4. The electronic component according to claim 2, wherein the first and the second side surface underlying electrodes are formed so as to extend in parallel with the end surfaces.

5. The electronic component according to claim 4, wherein a plurality of the first side surface underlying electrodes extend in parallel with one another.

6. The electronic component according to claim 2, wherein the first side surface underlying electrodes are electrically connected to the end surface underlying electrode via the inside of the electronic component body interposed.

7. The electronic component according to claim 2, wherein the first side surface underlying electrodes are electrically connected to the end surface underlying electrode via the outer surface of the electronic component body interposed.

8. The electronic component according to claim 2, wherein the first side surface underlying electrodes are formed on the side surfaces so as to extend integrally from the end surface underlying electrodes on the outer surface of the electronic component body.

9. The electronic component according to claim 1,
wherein the electronic component body has a rectangular parallelepiped shape in which the outer surface is defined by four side surfaces and two end surfaces orthogonal to each of the four side surfaces,
the underlying electrode includes a plurality of side surface underlying electrodes formed so as to be exposed to at least one side surface of the electronic component body,
the plating film is formed on at least one side surface of the electronic component body using a plurality of the side surface underlying electrodes serving as a seed electrode which is a starting point of plating growth,
the underlying main electrodes are provided by first side surface underlying electrodes, among the side surface underlying electrodes, located away from the specific end edges of the plating films at a greater distance than the underlying sub-electrodes, and
the underlying sub-electrodes are provided by second side surface underlying electrodes, among the side surface underlying electrodes, located along the specific end edges of the plating films.

10. The electronic component according to claim 9, wherein the first and the second side surface underlying electrodes are formed so as to be exposed to only one side surface.

11. The electronic component according to claim 10, wherein an exposed portion of the side surface underlying electrode exposed to the side surface is provided by a plurality of line segment-like exposed portions extending in parallel with one another along the specific end edge, and a longitudinal dimension of the line segment-like exposed portion of the second side surface underlying electrode is made larger than a longitudinal dimension of the line segment-like exposed portion of the first side surface underlying electrode.

12. The electronic component according to claim 9, wherein the first and the second side surface underlying electrodes are formed so as to be exposed to both of neighboring two side surfaces.

13. The electronic component according to claim 1, further comprising an internal conductor disposed inside the electronic component body and electrically connected to the external electrodes.

\* \* \* \* \*